US008850316B2

(12) United States Patent   (10) Patent No.: US 8,850,316 B2
Johnson   (45) Date of Patent: Sep. 30, 2014

(54) PRESENTING COMMUNITY AND INFORMATION INTERFACE CONCURRENT TO A MULTIMEDIA EXPERIENCE THAT IS CONTEXTUALLY RELEVANT ON A MULTIMEDIA CONSOLE SYSTEM

(75) Inventor: Jerry Alan Johnson, Medina, WA (US)

(73) Assignee: Microsoft Corporation, Redmond, WA (US)

( * ) Notice: Subject to any disclaimer, the term of this patent is extended or adjusted under 35 U.S.C. 154(b) by 258 days.

(21) Appl. No.: 11/355,652

(22) Filed: Feb. 16, 2006

(65) Prior Publication Data

US 2007/0191097 A1   Aug. 16, 2007

(51) Int. Cl.
*G06F 3/00* (2006.01)
*G06Q 10/10* (2012.01)
*A63F 13/30* (2014.01)

(52) U.S. Cl.
CPC ............... *A63F 13/12* (2013.01); *G06Q 10/10* (2013.01); *A63F 2300/572* (2013.01); *A63F 2300/807* (2013.01)
USPC ........... 715/708; 715/705; 715/712; 715/714; 715/733; 715/751

(58) Field of Classification Search
CPC ............................. G06F 17/30041; G06F 3/14
USPC ........................................................ 715/708
See application file for complete search history.

(56) References Cited

U.S. PATENT DOCUMENTS

| | | | | |
|---|---|---|---|---|
| 5,563,805 A * | 10/1996 | Arbuckle et al. | ............. | 709/204 |
| 5,754,176 A * | 5/1998 | Crawford | ...................... | 715/711 |
| 5,918,010 A * | 6/1999 | Appleman et al. | ............ | 709/203 |
| 6,219,047 B1 * | 4/2001 | Bell | ............................. | 715/705 |
| 6,256,620 B1 * | 7/2001 | Jawahar et al. | .................... | 707/2 |
| 6,352,479 B1 * | 3/2002 | Sparks, II | ........................ | 463/42 |
| 6,699,125 B2 * | 3/2004 | Kirmse et al. | .................. | 463/42 |
| 6,935,954 B2 * | 8/2005 | Sterchi et al. | .................... | 463/31 |
| 7,207,011 B2 * | 4/2007 | Mulvey et al. | ................ | 715/812 |

(Continued)

FOREIGN PATENT DOCUMENTS

EP    1591150 A1   11/2005
JP    2001224865 A   8/2001

(Continued)

OTHER PUBLICATIONS

Daniel Larocque, State Pattern in C++ Applications, Sep. 14, 2001.*

(Continued)

*Primary Examiner* — Matt Kim
*Assistant Examiner* — Yongjia Pan
(74) *Attorney, Agent, or Firm* — Bryan Webster; Peter Taylor; Micky Minhas

(57) ABSTRACT

A system architecture that predefines a unique schema around content or applications so that the actions of a user are understood outside a specific piece of content or application. Additionally, the application also reports to system applications what specific locations or actions are currently being undertaken by a user. With this data, the system application can build a system whereby it concurrently presents contextual information to users outside of the specific piece of content or application in a way that supports bringing users with similar contextual states together and allow other information services to be hosted and presented concurrently to the user outside the specific piece of content or application on the multimedia device.

8 Claims, 7 Drawing Sheets

(56) References Cited

U.S. PATENT DOCUMENTS

| | | | |
|---|---|---|---|
| 7,490,286 B2* | 2/2009 | Commarford et al. | 715/200 |
| 7,647,560 B2* | 1/2010 | Macauley et al. | 715/758 |
| 8,038,535 B2* | 10/2011 | Jensen | 463/42 |
| 8,352,983 B1* | 1/2013 | Chane et al. | 725/43 |
| 2002/0086732 A1* | 7/2002 | Kirmse et al. | 463/42 |
| 2003/0043179 A1* | 3/2003 | Gusler et al. | 345/708 |
| 2003/0045358 A1* | 3/2003 | Leen et al. | 463/42 |
| 2003/0109305 A1* | 6/2003 | Gavin et al. | 463/31 |
| 2003/0220145 A1 | 11/2003 | Erickson et al. | |
| 2004/0044635 A1* | 3/2004 | Gordon et al. | 706/50 |
| 2004/0162144 A1* | 8/2004 | Loose et al. | 463/42 |
| 2004/0198497 A1* | 10/2004 | Yamashita et al. | 463/43 |
| 2005/0027382 A1* | 2/2005 | Kirmse et al. | 700/91 |
| 2005/0071786 A1* | 3/2005 | Mariani et al. | 715/967 |
| 2005/0240603 A1 | 10/2005 | Bodin et al. | 707/100 |
| 2005/0245314 A1 | 11/2005 | Pirich et al. | 463/36 |
| 2005/0246638 A1* | 11/2005 | Whitten | 715/708 |
| 2006/0287106 A1* | 12/2006 | Jensen | 463/42 |
| 2007/0087797 A1* | 4/2007 | Van Luchene | 463/1 |
| 2008/0318651 A1* | 12/2008 | Gross et al. | 463/13 |

FOREIGN PATENT DOCUMENTS

| | | |
|---|---|---|
| JP | 2001273255 A | 10/2001 |
| JP | 2003088677 A | 3/2003 |
| JP | 2005157527 A | 6/2005 |
| JP | 2005182116 A | 7/2005 |
| JP | 2005346705 A | 12/2005 |
| KR | 2000-0072677 A | 5/2000 |
| WO | 2004036807 A2 | 4/2004 |

OTHER PUBLICATIONS

Japanese Patent Office, Notice of Rejection of JP2008555240, Oct. 19, 2012, 9 pages.

"European Search Report", Mailed Date: Jun. 24, 2011, Application No. EP/07716876, Filed Date: Jun. 22, 2011, pp. 7. (MS# 315126.03).

ISA Korean Intellectual Property Office, International Search Report of PCT/US2007/001614, Jun. 27, 2007, 3 pages.

* cited by examiner

PRESENTING COMMUNITY AND INFORMATION INTERFACE CONCURRENT TO A MULTIMEDIA EXPERIENCE THAT IS CONTEXTUALLY RELEVANT ON A MULTIMEDIA CONSOLE SYSTEM

COPYRIGHT NOTICE/PERMISSION

A portion of the disclosure of this patent document contains material, which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings hereto: Copyright© 2006, Microsoft Corporation, All Rights Reserved.

TECHNICAL FIELD

This invention generally relates to the field of multimedia devices. In particular, the present invention is directed to a system architecture that predefines a unique schema around each piece of content or application that runs on the system so that the actions of a user are understood outside the specific piece of content or application.

BACKGROUND

In recent years, multimedia devices, such as gaming consoles, have become very popular with consumers. Many of the experiences on these devices center around understanding how to complete tasks, make progress or build skills in specific pieces of content or applications on the device. Additionally, the interaction of users who play these games has begun to transcend the specific content/application and in fact now goes beyond the device itself. Thus, when users want to get together to discuss what they are currently doing in a game, leave information for others on how they completed something, or find information on how a user completed something in the past, there has been no specific way to do this.

Generally, individuals do this by creating their own taxonomy for a game and at best, organize bulletin boards and online forums for the exchange of information on the web. Additionally, most game hints are shared this way on the web or through the publication (online and offline) of a book that instructs users what they can do to get through certain experiences. The problem with these approaches is that it is not immediately contextually relevant to a user's experience in their current game. The user must leave the multimedia experience and search out the information or other social contacts on their own with no direct tie to the experience they are currently in. Very often the information is not timely, well organized, and definitely does not provide the user with an integrated experience.

Another option is for the multimedia application or game to create its own specific help in game. This can meet the need of users currently executing the specific media application or game. However, users outside the game can not take part in the community or display this information. It is strictly an in media/game experience and does not leverage the contextual information pre-defined about the game so that it can be integrated into other social, purchase, or information scenarios outside the game.

As these experiences continue to get more complex inside the content and applications running on these multimedia devices, there will be more pressure to integrate these social and informative networks directly into the experience.

SUMMARY

This present invention is directed to a system architecture that predefines a unique schema around each piece of content or application that runs on the system so that the actions of a user are understood outside the specific piece of content or application. Additionally the application also reports out to the system application what specific locations or actions are currently being undertaken by a user. In accordance with an aspect of the invention there is provided a multimedia console having a central processing unit, a graphics processing unit, a memory and an input device. The system then hosts applications and services that run concurrent to the multimedia content or application. Users can instantiate these system applications and services via a standard interface at all times. Since these services and system applications all run residing in the memory and running concurrently with a multimedia application, as the multimedia application defines the contextual taxonomy and reports the instrumented current state of a user. The system can provide services that allow a user to get information, such as relative hits or user postings, and make social contacts with others in similar states in the concurrent system application or service.

According to the feature, the service supports a system application that provides the user with the ability to find contextually relevant information posted by other users in the same contextual situation in the multimedia application, as well as leave contextually relevant information for others.

According to another feature, the service supports a system application that provides the user with the ability to interact via voice, video, or text chat, with other users in the same contextual situation in the multimedia or gaming application.

According to yet another feature, the service supports a system application where content can be pre-published and updated in accordance with the predefined contextually schema of the multimedia application or content, and made available contextually for access or purchase by the user in the concurrent system application, while still in the multimedia application or game.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION

Figure 1:
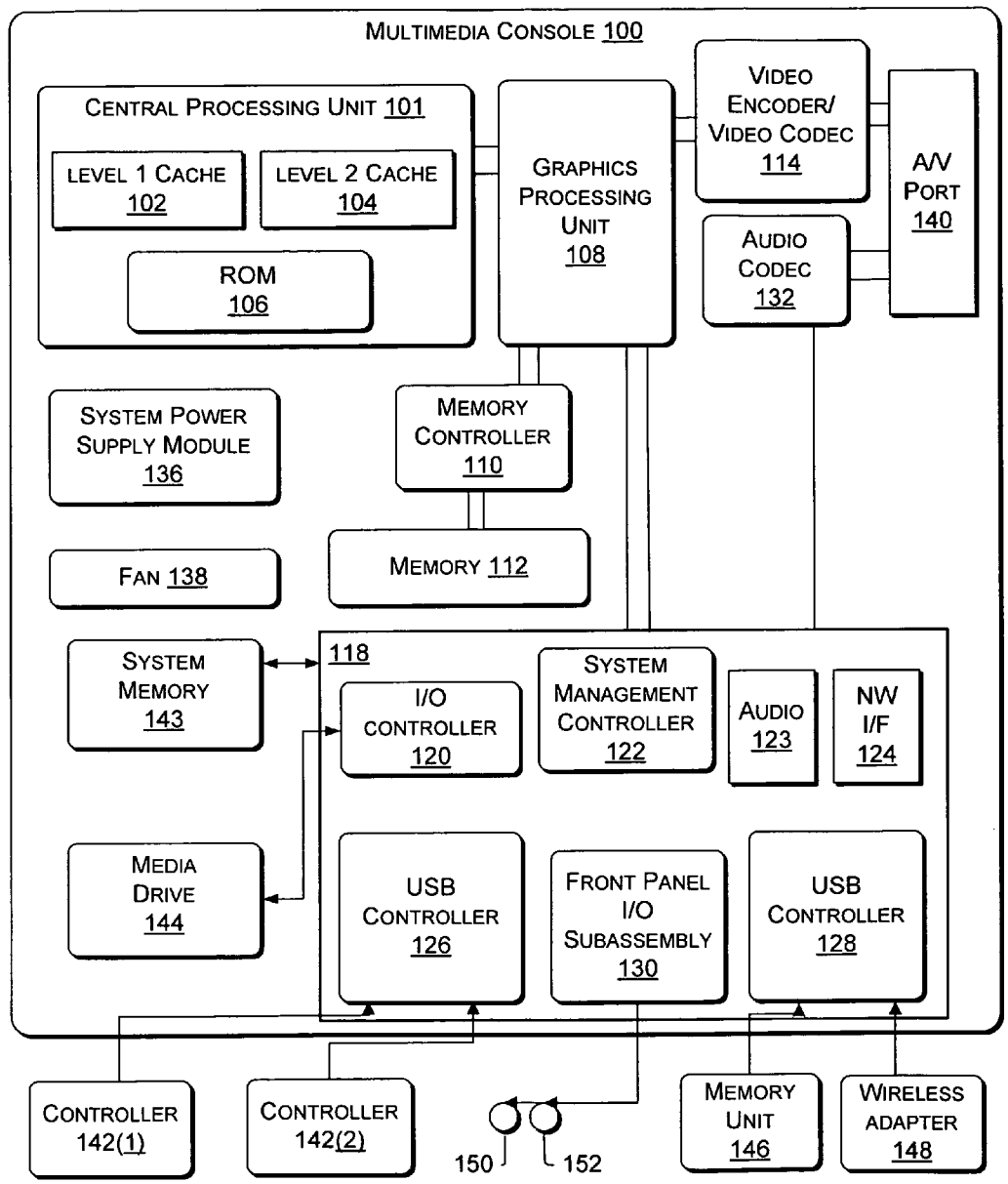
FIG. 1 is a block diagram showing an exemplary multimedia console.

FIG. 1 illustrates the functional components of a multimedia console 100 in which certain aspects of the present invention may be implemented. The multimedia console 100 has a central processing unit (CPU) 101 having a level 1 cache 102, a level 2 cache 104, and a flash ROM (Read Only Memory) 106. The level 1 cache 102 and a level 2 cache 104 temporarily store data and hence reduce the number of memory access cycles, thereby improving processing speed and throughput. The CPU 101 may be provided having more than one core, and thus, additional level 1 and level 2 caches 102 and 104. The flash ROM 106 may store executable code that is loaded during an initial phase of a boot process when the multimedia console 100 is powered ON.

A graphics processing unit (GPU) 108 and a video encoder/video codec (coder/decoder) 114 form a video processing pipeline for high speed and high resolution graphics processing. Data is carried from the graphics processing unit 108 to the video encoder/video codec 114 via a bus. The video processing pipeline outputs data to an A/V (audio/video) port 140 for transmission to a television or other display. A memory controller 110 is connected to the GPU 108 to facilitate processor access to various types of memory 112, such as, but not limited to, a RAM (Random Access Memory).

The multimedia console 100 includes an I/O controller 120, a system management controller 122, an audio processing unit 123, a network interface controller 124, a first USB host controller 126, a second USB controller 128 and a front panel I/O subassembly 130 that are preferably implemented on a module 118. The USB controllers 126 and 128 serve as hosts for peripheral controllers 142(1)-142(2), a wireless adapter 148, and an external memory device 146 (e.g., flash memory, external CD/DVD ROM drive, removable media, etc.). The network interface 124 and/or wireless adapter 148 provide access to a network (e.g., the Internet, home network, etc.) and may be any of a wide variety of various wired or wireless interface components including an Ethernet card, a modem, a Bluetooth module, a cable modem, and the like.

System memory 143 is provided to store application data that is loaded during the boot process. A media drive 144 is provided and may comprise a DVD/CD drive, hard drive, or other removable media drive, etc. The media drive 144 may be internal or external to the multimedia console 100. Application data may be accessed via the media drive 144 for execution, playback, etc. by the multimedia console 100. The media drive 144 is connected to the I/O controller 120 via a bus, such as a Serial ATA bus or other high speed connection (e.g., IEEE 1394).

The system management controller 122 provides a variety of service functions related to assuring availability of the multimedia console 100. The audio processing unit 123 and an audio codec 132 form a corresponding audio processing pipeline with high fidelity and stereo processing Audio data is carried between the audio processing unit 123 and the audio codec 132 via a communication link The audio processing pipeline outputs data to the A/V port 140 for reproduction by an external audio player or device having audio capabilities.

The front panel I/O subassembly 130 supports the functionality of the power button 150 and the eject button 152, as well as any LEDs (light emitting diodes) or other indicators exposed on the outer surface of the multimedia console 100. A system power supply module 136 provides power to the components of the multimedia console 100. A fan 138 cools the circuitry within the multimedia console 100.

The CPU 101, GPU 108, memory controller 110, and various other components within the multimedia console 100 are interconnected via one or more buses, including serial and parallel buses, a memory bus, a peripheral bus, and a processor or local bus using any of a variety of bus architectures.

When the multimedia console 100 is powered ON, application data may be loaded from the system memory 143 into memory 112 and/or caches 102, 104 and executed on the CPU 101. The application may present a graphical user interface that provides a consistent user experience when navigating to different media types available on the multimedia console 100. In operation, applications and/or other media contained within the media drive 144 may be launched or played from the media drive 144 to provide additional functionalities to the multimedia console 100.

The multimedia console 100 may be operated as a standalone system by simply connecting the system to a television or other display. In this standalone mode, the multimedia console 100 allows one or more users to interact with the system, watch movies, or listen to music. However, with the integration of broadband connectivity made available through the network interface 124 or the wireless adapter 148, the multimedia console 100 may further be operated as a participant in a larger network community.

When the multimedia console 100 is powered ON, a set amount of hardware resources are reserved for system use by the multimedia console operating system. These resources may include a reservation of memory (e.g., 16 MB), CPU and GPU cycles (e.g., 5%), networking bandwidth (e.g., 8 kbs), etc. Because these resources are reserved at system boot time, the reserved resources do not exist from the application's view.

In particular, the memory reservation preferably is large enough to contain the launch kernel, concurrent system applications and drivers. The CPU reservation is preferably maintained at a constant level.

With regard to the GPU reservation, lightweight messages generated by the system applications (e.g., popups) are displayed by using a GPU interrupt to schedule code to render popup into an overlay. The amount of memory required for an overlay depends on the overlay area size and the overlay preferably scales with screen resolution. Where a full user interface is used by the concurrent system application, it is preferable to use a resolution independent of game resolution. A scaler may be used to set this resolution such that the need to change frequency and cause a TV resynch is eliminated.

After the multimedia console 100 boots and system resources are reserved, concurrent system applications execute to provide system functionalities. The system functionalities are encapsulated in a set of system applications that execute within the reserved system resources described above. The operating system kernel identifies threads that are system application threads versus multimedia application threads. The system applications are preferably scheduled to run on the CPU 101 at predetermined times and intervals in order to provide a consistent system resource view to the application. The scheduling is to minimize cache disruption for the multimedia application running on the console.

When a concurrent system application requires audio, audio processing is scheduled asynchronously to the multimedia application due to time sensitivity. A multimedia console application manager (described below) controls the multimedia application audio level (e.g., mute, attenuate) when system applications are active.

Input devices (e.g., controllers 142(1) and 142(2)) are shared by multimedia applications and system applications. The input devices are not reserved resources, but are to be switched between system applications and the multimedia application such that each will have a focus of the device. The application manager preferably controls the switching of input stream, without knowledge the multimedia application's knowledge and a driver maintains state information regarding focus switches.

As will be described below, a system architecture is disclosed that predefines a unique schema around each piece of content or application that runs on the system so that the actions of a user are understood outside the specific piece of content or application. Additionally, the application also reports out to the system application what specific locations or actions are currently being undertaken by a user. With this data, the system application can build a system whereby it concurrently presents contextual information to users outside of the specific piece of content or application in a way that supports bringing users with similar contextual states together and allow other information services to be hosted and presented concurrently to the user outside the specific piece of content or application on the multimedia device.

Figure 2:
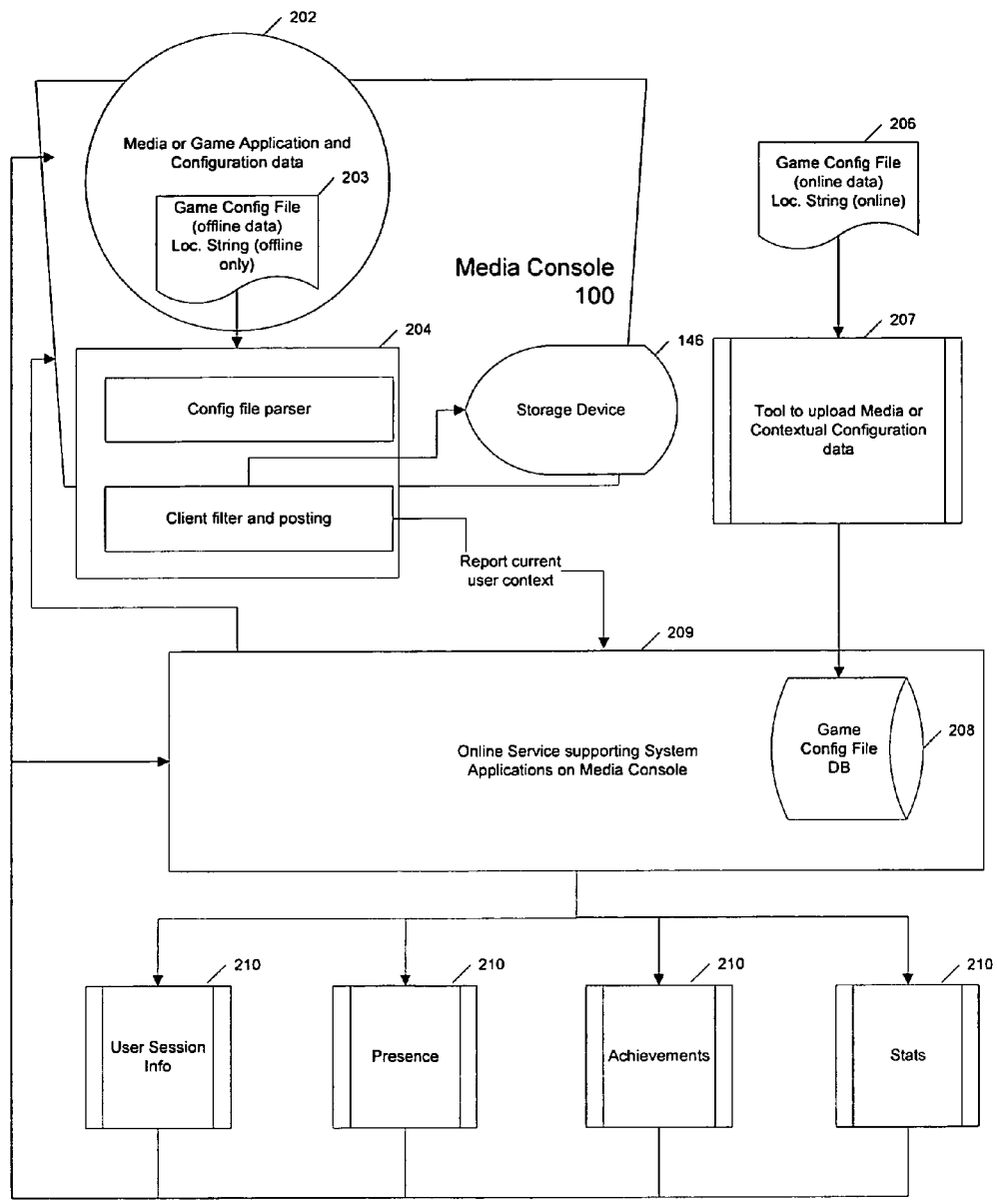
FIG. 2 is a block diagram illustrating a media or gaming device and the interaction with a service.

Referring to FIG. 2, there is illustrated a block diagram of the media or gaming device 100 and the interaction with a service 209. The exemplary interaction in FIG. 2 illustrates how the media console 100 is able to support both an application feeding contextual state information to the online service 209, and how the console 100 can display and interact with the contextual state information even if the console itself does not have access to the specific game of media application.

The console 100 will have a game or media application 202 executing on it. This game or media application 202 will have predefined configuration data 203 that is distributed with the game or media application 202 which that application always has access to. This predefined configuration data defines contextual states a user could be in while running the game or media application 202. Concurrent to the media or game application 202, there is a system process 204 running on the media console 100.

While the game or media application 202 is executing, it can post contextual state information that maps to known states in the predefined configuration data 203. This data is posted to the concurrent system process 204. The concurrent system process 204 also updates state information locally on the media console's storage device 146, as well as reports this contextual state data up to the service 209 on, e.g., the Internet, local area network, wide area network, etc.

The predefined configuration data 203 included with the game or media application 202 may also be made available as predefined configuration data 206, which is outside the game or media application 202. This version of the predefined configuration data 206, is parsed by a tool 207 and uploaded with other game of media configuration data to a storage location 208 on an online service 209.

The online service 209, aggregates this contextual information for all media consoles 100 that are connected to the service 209. The console 100 additionally provides a user interface and a set of APIs so that games or media application running on the service, and display the contextual information related to a user's session information, presence, achievements, and or stats 210.

Figure 3:
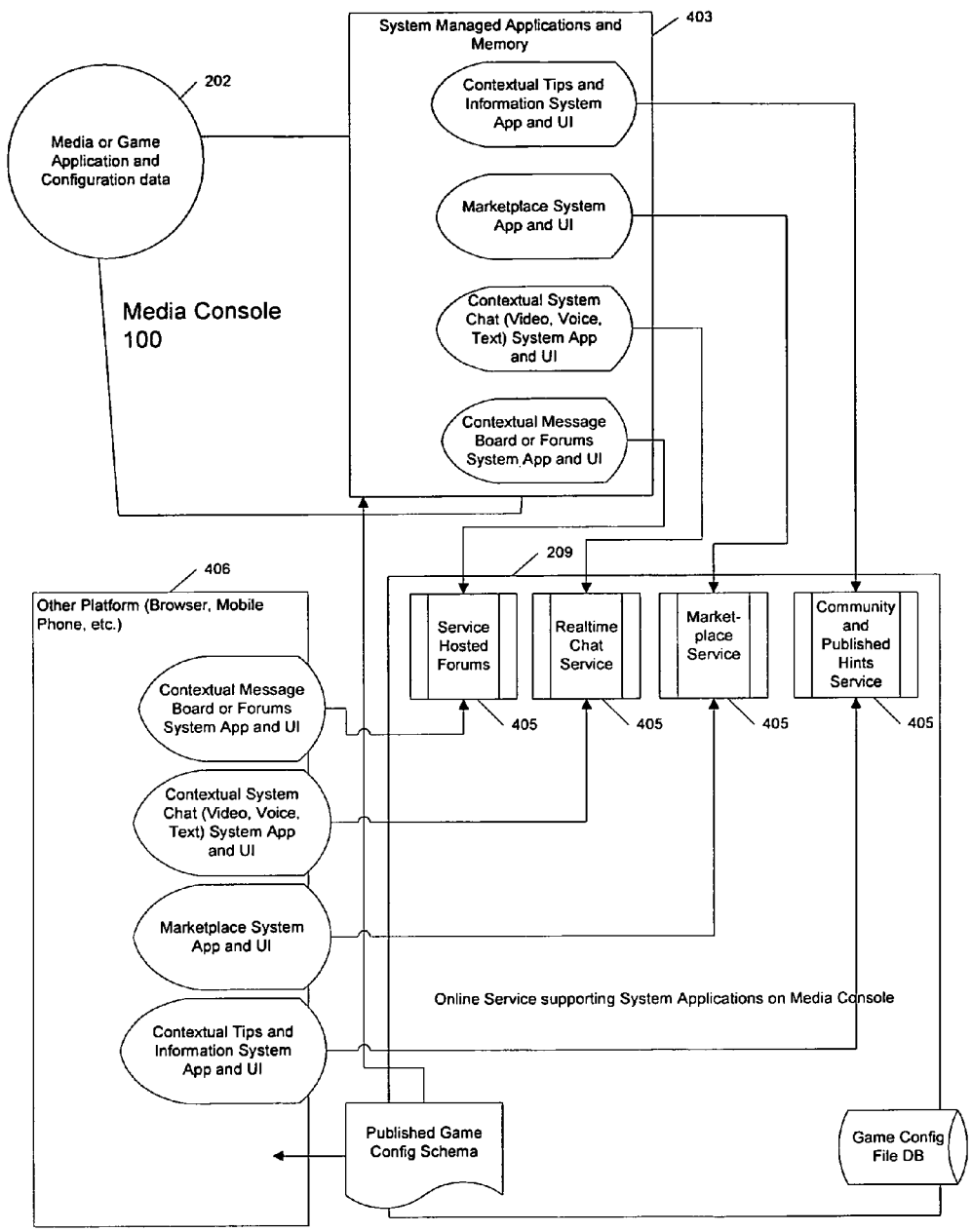
FIG. 3 is a block diagram illustrating the interaction with the system of FIG. 2.

FIG. 3 is a block diagram illustrating the interaction with the system of FIG. 2. This diagram illustrates how the system defined of FIG. 2, can provide advantageous value-added services to users such as contextual tips, contextual chat, contextual marketplace items, and contextual forums.

As in FIG. 2, the media console 100 may have a media or game application running on it. This media or game application 202 preferably continuously reports contextual state information to the system process and to the online service 209. A set of system managed applications 403 support features that interact with the online service 209 and present functionality to the user that is contextually relevant. The system managed applications 403 on the media console 100 may rely on the support of services 405 hosted by the online service 209. Additionally, applications 406 outside of the media console 100 may access the services 405, and provide access to interact with console users based on a media console user's specific contextual state.

Figure 4:
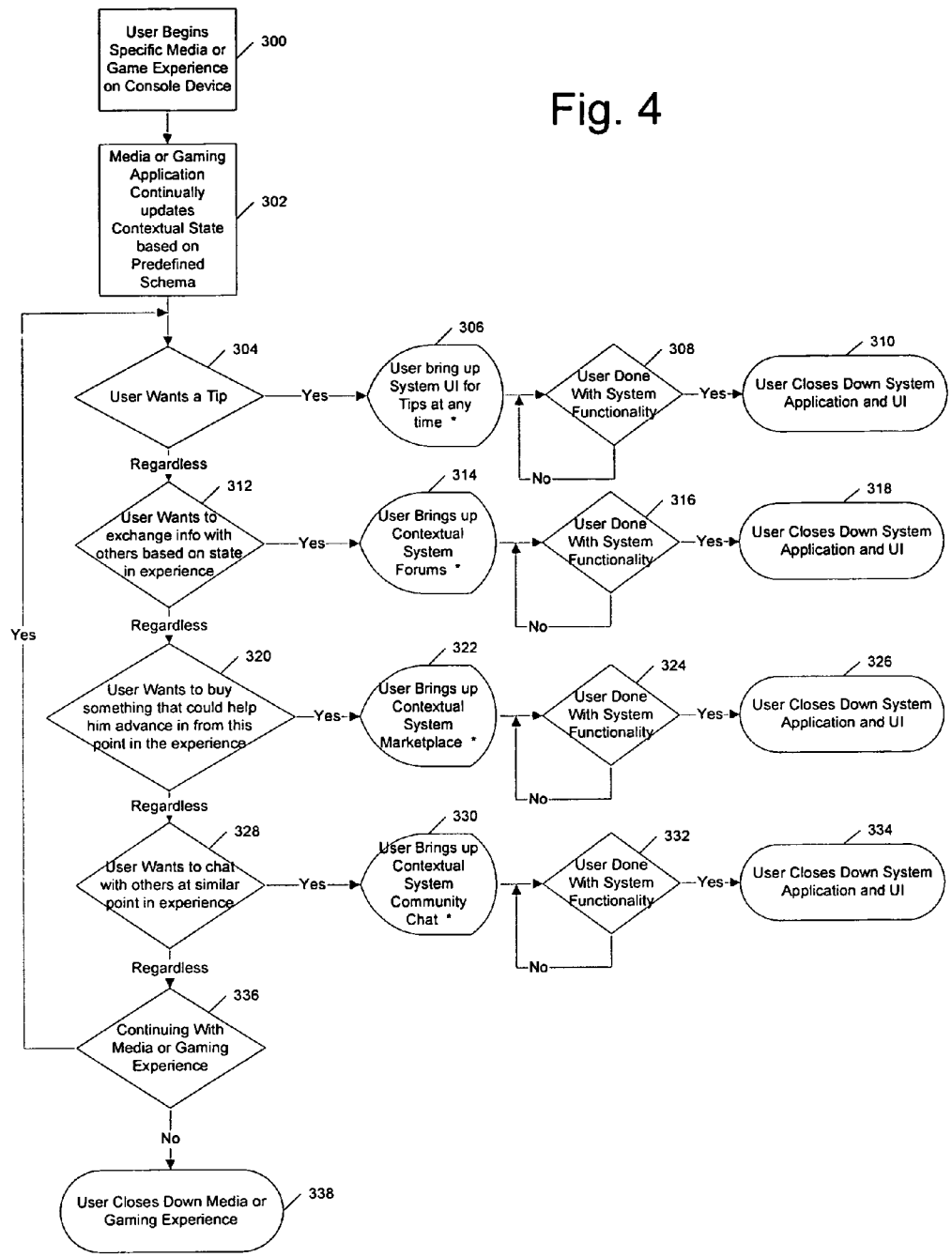
FIG. 4 is a flowchart of the user processes.

FIG. 4 is a flowchart of the user processes. The processes begin at step 300 where the user begins a specific media or gaming experience on the console 100. At step 302, the media or game continuously updates the contextual state based on a predefined schema. At step 304, the user desires a tip. At step 306, the console 100 launches a system user interface for tips. This user interface may run concurrently with the media or gaming application. When both are instantiated, it is preferable that there is not a requirement that each continue operating to support the other application. At step 308, it is determined if the user is completed with the system user interface. If so, the user closes the system application/user interface at step 310. If not, processing continues at step 308 until user completion.

At step 312, the user indicates the desire to exchange information with others based on the state in the game experience. Step 312 occurs without regard to the user indication in step 304. At step 314, the user launches contextual system forums. The forums may run concurrently with the media or gaming application. When both are instantiated, it is preferable that there is not a requirement that each continue operating to support the other application. At step 316, it is determined if the user is completed with the forums. If so, the user closes the system application/user interface at step 318. If not, processing continues at step 316 until user completion.

At step 320, the user desires to purchase something that may help advance game play or the user experience. Step 320 occurs without regard to the user indication in step 312. At step 322, the user launches a system user interface for a contextual system marketplace. This user interface may also run concurrently with the media or gaming application. When both are instantiated, it is preferable that there is not a requirement that each continue operating to support the other application. At step 324, it is determined if the user is completed with the contextual system marketplace. If so, the user closes the system application/user interface at step 326. If not, processing continues at step 324 until user completion.

At step 328, the user desires to chat with others at a similar point in the game experience. Step 328 occurs without regard to the user indication in step 320. At step 330, the user launches a system user interface for community chat. This user interface may run concurrently with the media or gaming application. When both are instantiated, it is preferable that there is not a requirement that each continue operating to support the other application. At step 332, it is determined if the user is completed with the system chat user interface. If so, the user closes the system application/user interface at step 334. If not, processing continues at step 332 until user completion.

At step 336, the media or gaming experience continues by returning to step 304, where steps 304, 312, 320, 328 and 336 run as a loop until the user closes the media or gaming experience at step 338.

Figure 5:
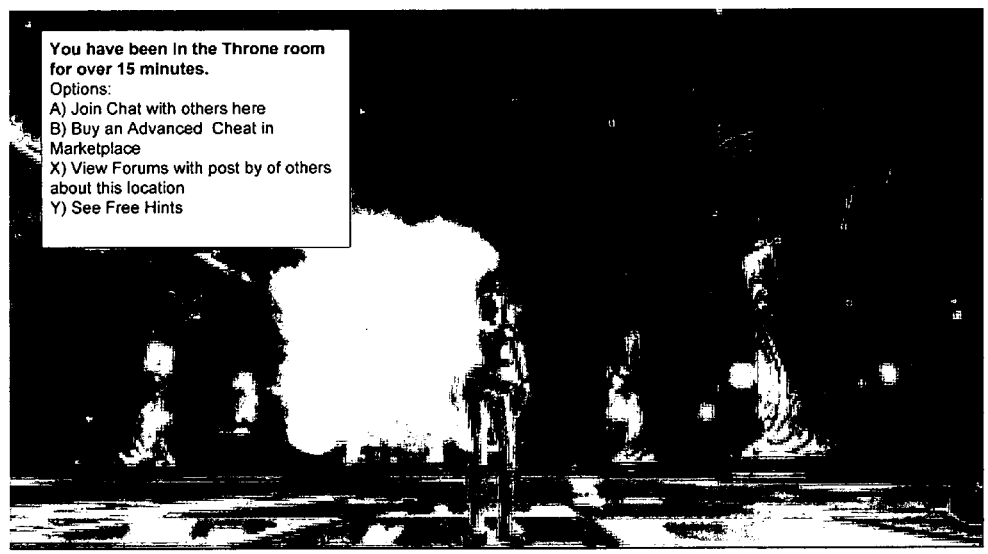
FIG. 5 is an exemplary user interface of different contextual options that may be provided to users concurrently in a game experience.
Figure 6:
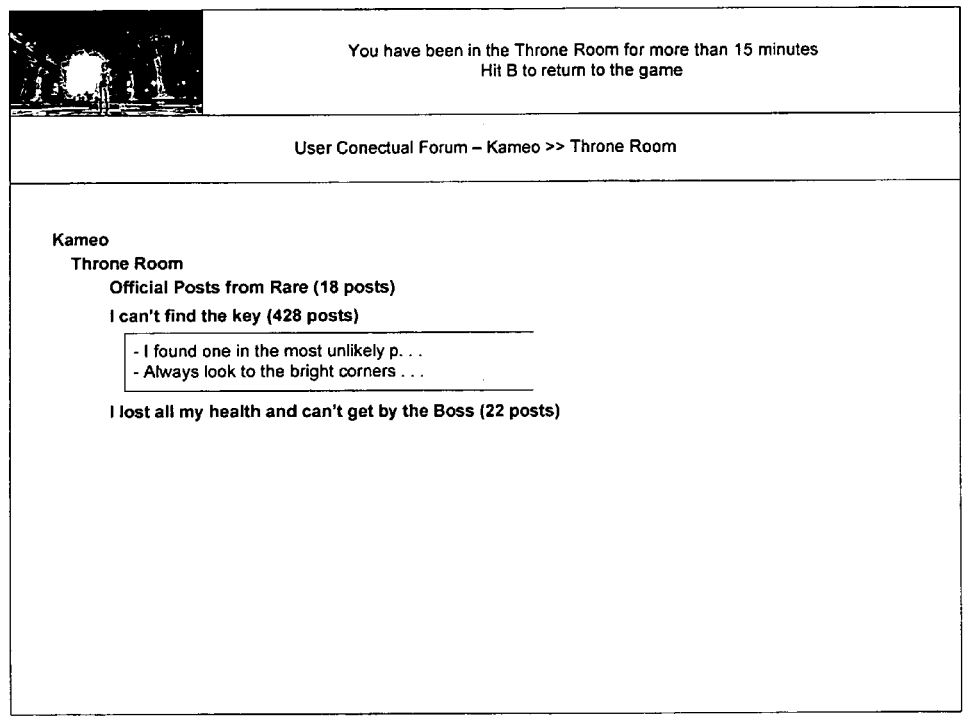
FIG. 6 is an exemplary user interface illustrating the presentation of contextually relevant information posted by the community of users taking part in the multimedia experience.
Figure 7:
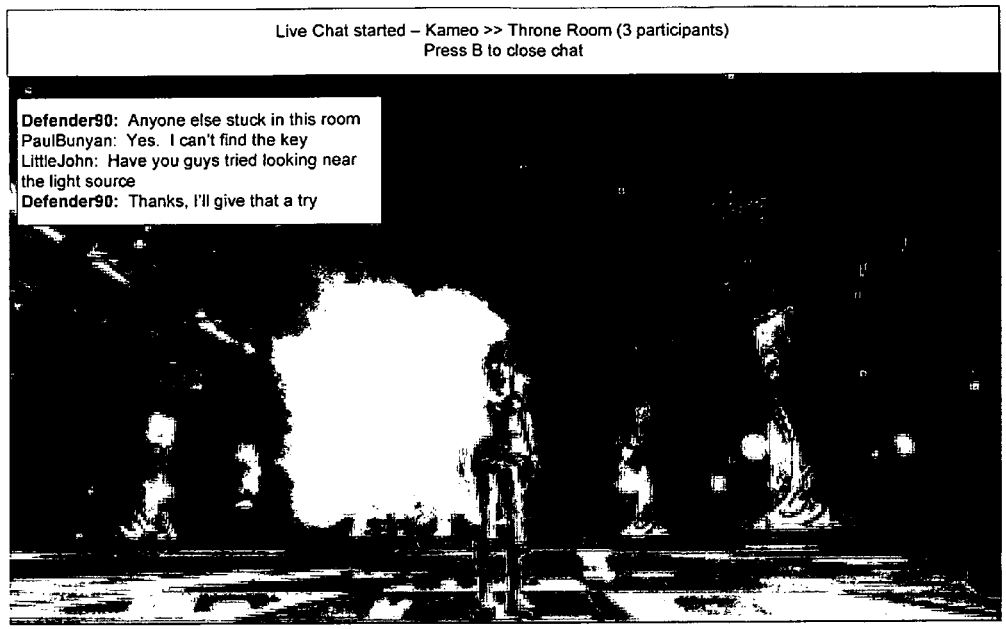
FIG. 7 is an exemplary user interface illustrating how a user may interact in real-time with other users currently in the same contextual situation.

FIGS. 5-7 illustrate exemplary user interfaces. FIG. 5 is an exemplary user interface of different contextual options that may be provided to users in a game experience. As discussed above, the contextual options are relevant to the user's present state within the multimedia experience. FIG. 6 is an exemplary user interface illustrating the presentation of contextually relevant information posted by the community of users taking part in the multimedia experience. FIG. 7 is yet another exemplary user interface illustrating how a user may interact in real-time with other users currently in the same contextual situation. The example shown in FIG. 7 illustrates real-time text chat, however could take the form of voice or video chat between users, etc.

While the present invention has been described in connection with the preferred embodiments of the various Figs., it is to be understood that other similar embodiments may be used or modifications and additions may be made to the described embodiment for performing the same function of the present invention without deviating therefrom.

What is claimed:

1. A method of providing contextual services in a gaming device, comprising:
   executing a game application on said gaming device;
   providing predefined configuration data for the game application, wherein said configuration data defines contextual states associated with the game application, wherein said contextual states represent specific game locations or game actions currently being undertaken by a game character in the game application;
   updating contextual state information associated with said game application, wherein the contextual state information maps to the contextual states within the game application defined by the configuration data to define a context for a gaming experience;
   reporting and updating said contextual state information to a remote service; and
   receiving contextual services from said remote service via a contextual services user interface, the contextual services being based on an aggregation of the contextual state information and other contextual state information reported to the remote service from other gaming devices, the contextual services providing relevant assistance to a game user based on a game location or a game action currently being undertaken by the game character and other game characters controlled by other users on other gaming devices in a shared gaming experience in the game application, and the contextual services comprising a chat service facilitating communication between the game user and the other users at the game location via a community chat user interface, the community chat user interface enabling presentation of contextually relevant information for the game location that is posted by the game user or the other users, and the community chat user interface being presented concurrently with the game application, wherein the contextual services further comprise a game user forum facilitating exchange of game information via postings by the game user or by other users of the other gaming devices having a gaming experience relevant to the game location or the game action currently being undertaken by the game character in the game application.

2. The method of claim 1, wherein the contextual services comprise contextually relevant tips to assist said game user in game play.

3. The method of claim 1, wherein the contextual services comprise a system marketplace providing contextually relevant information available for purchase for advancing game play or the gaming experience.

4. The method of claim 1, further comprising providing said chat service as one or more of video, audio and a text service.

5. A computing device comprising:
   a processing device; and
   a storage device having stored thereon instructions executable by the processing device to:
      execute a game application on said gaming device;
      provide predefined configuration data for the game application, wherein said configuration data defines contextual states associated with said game application, wherein said contextual states indicate specific game locations or game actions currently being undertaken by a game character in the game application;
      update contextual state information associated with said game application, wherein the contextual state information maps to the contextual states within the game application defined by the configuration data to define a context for a gaming experience;
      report said contextual state information to a remote service; and
      receive contextual services from said remote service via a contextual services user interface, the contextual services being based on an aggregation of the contextual state information and other contextual state information reported to the remote service from other gaming devices, the contextual services providing relevant assistance to a game user based on a game location or a game action currently being undertaken by the game character and currently or previously undertaken by other game characters controlled by other users on other gaming devices in a shared gaming experience in the game application, and the contextual services comprising a game user forum and a chat service, the game user forum facilitating exchange of game information via postings by the game user or by other users of the other gaming devices having a gaming experience relevant to the game location or the game action currently being undertaken by the game character in the game application, the chat service facilitating communication between the game user and the other users at the game location via a community chat user interface, the community chat user interface enabling presentation of contextually relevant information for the game location that is posted by the game user and the other users, and the community chat user interface being presented concurrently with the game application.

6. The computing device of claim 5, wherein the contextual services comprise contextually relevant tips to assist said game user in game play.

7. The computing device of claim 5, wherein the contextual services comprise a system marketplace providing contextually relevant information available for purchase for advancing game play or the gaming experience.

8. The computing device of claim 5, wherein the contextual services comprise a community chat service facilitating communication between the game user and other users of the other gaming devices at a similar point within the gaming experience.

* * * * *